United States Patent Office 3,847,954
Patented Nov. 12, 1974

3,847,954
3-OXYGENATED 23-DI(LOWER ALKYL)AMINO-22-METHYL-24-NORCHOLA-4/5,20(22)-DIENES AND INTERMEDIATES
George R. Lenz, Glenview, Ill., assignor to
G. D. Searle & Co., Chicago, Ill.
No Drawing. Filed July 30, 1973, Ser. No. 383,764
Int. Cl. C07c 169/32, 169/34
U.S. Cl. 260—397.1            14 Claims

ABSTRACT OF THE DISCLOSURE

Preparation of antibiotic, antiulcerogenic, and antiinflammatory 3 - oxygenated 23-di(lower alkyl)amino-22-methyl - 24-norchola-4/5,20(22)-dienes, and corresponding amides useful as intermediates thereto, is disclosed.

---

This invention relates to 3-oxygenated N,N-di(lower alkyl)-22-methyl-24-norchola - 4/5,20(22) - diene - 23-amides and 23-di(lower alkyl)amino-22-methyl-24 - norchola-4/5,20(22)-dienes, and to processes for the preparation thereof. More particularly, this invention provides new, useful, and unobvious steroids of the formula

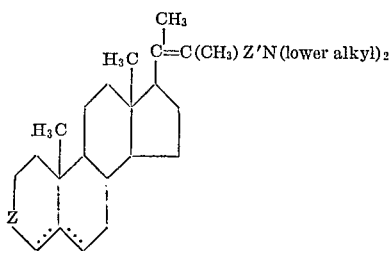

wherein Z represents β-(lower alkanoyloxy)methylene, β-hydroxymethylene, or carbonyl; Z' represents methylene or carbonyl; and the dotted line denotes $\Delta^4$ unsaturation when Z represents carbonyl and $\Delta^5$ unsaturation otherwise.

Equivalent to the foregoing amines (compounds depicted when Z' represents methylene) for the purposes of this invention are corresponding acid addition salts having the formula

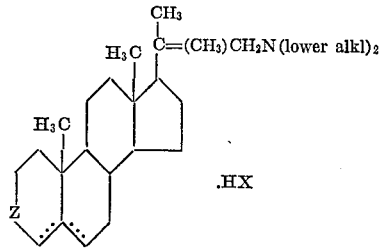

and hydrates thereof, Z and the dotted line in the latter formula retaining the meanings previously assigned and X representing 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither biologically nor otherwise undesirable.

By "lower alkyl" is meant methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight- or branched-chain, hydrocarbon groupings of the formula $$-C_nH_{2n+1}$$

wherein $n$ represents a positive integer less than 8. "Lower alkanoyloxy" as used herein designates a radical of the formula

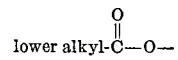

The amines of this invention, their salts, and the hydrates thereof are useful by reason of their valuable biological properties; and the corresponding amides are useful as intermediates thereto. Among the aforesaid biological properties, antibiotic activity predominates. This activity includes the capacity to inhibit the growth of bacteria such as *Bacillus subtillis* and *Erwinia sp.*; protozoa such as *Trichomonas vaginalis*; helminths such as *Turbatrix aceti*; fungi such as *Trichophyton mentagrophytes, Candida albicans,* and *Verticillium albo-atrum*; and algae such as *Chlorella vulgaris*. Antiulcerogenic and antiinflammatory activity also inheres.

Standardized tests for the foregoing antibiotic activities are described in U.S. 3,679,697 and U.S. 3,682,951. (Z)-23-Diethylamino-22-methyl-24 - norchola - 4,20(22)-dien-3-one hydrochloride hemihydrate, the product of Example 3C hereinafter, was found active in these tests at 100 mcgm. per ml. against *B. subtilis, Erwinia sp., V. albo-atrum,* and *C. vulgaris,* and at 1000 mcgm. per ml. against *T. vaginalis, T. aceti, T. mentagrophytes,* and *C. albicans.* (E)-23-Diethylamino-22-methyl-24 - norchola - 5,20(22)-dien-3β-ol hydrochloride, the product of Example 5A, was found active at 1 mcgm. per ml. against *C. vulgaris*; at 10 mcgm. per ml. against *B. subtilis* and *Erwinia sp.*; and at 1000 mcgm. per ml. against *T. vaginalis, T. aceti, T. mentagrophytes, C. albicans* and *V. albo-atrum.*

Both (E) - 3β-acetoxy-23-diethylamino-22-methyl - 24-norchola-5,20(22)-diene, the product of Example 8, and the hydrochloride of its *cis* isomer disclosed in Example 9B were found active at 10 mg. intragastrically in the standardized test for antiulcerogenic activity described in U.S. 3,483,192. The latter compound was found active at 5 mg. intragastrically in the standardized test for antiinflammatory activity described in column 2, lines 32–62 of U.S. 3,728,338, as was also (Z)-23-diethylamino-22-methyl-24-norchola-5,20(22) - dien-3β-ol hydrochloride, the product of Example 6.

Those skilled in the art will recognize that observations of activity in standardized tests for particular biological effects are fundamental to the development of valuable new drugs, both veterinary and human.

The compounds of this invention can be prepared as follows: A 3β-(lower alkanoyloxy)pregn-5-en-20-one is contacted with an N,N-di(lower alkyl)-1-propynylamine in the presence of boron trifluoride etherate and dioxane, affording a mixture of *cis* and *trans* 3β-(lower alkanoyloxy) - N,N - di(lower alkyl)-22-methyl-24-norchola- 5,20(22)-dien-23- amide which can be separated by chromatography if desired. [The configuration deriving from the exocyclic double bond in this and other products of the invention is acritical: both *cis* and *trans* isomers will serve for the contemplated purposes.] The ester linkage is cleaved by contacting with aqueous methanolic potassium carbonate, and the resultant 3β-hydroxy-N,N-(lower alkyl)-22-methyl - 24 - norchola-5,20(22)-dien-23-amide is oxidized via the Oppenauer procedure to an N,N-di-(lower alkyl) - 22 - methyl-3-oxo-24-norchola-4,20(22)-dien-23-amide. The 3-keto group in the latter compound is protected by condensation with triethyl orthoformate in the presence of *p*-toluenesulfonic acid monohydrate, dioxane, and absolute ethanol; the resultant 3-ethoxy-N,N-di(lower alkyl) - 22 - methyl-24-norchola-3,5,20-(22)-trien-23-amide is heated with lithium tetrahydroaluminate(1-) in tetrahydrofuran whereby the amidic oxygen is reduced; and the 23-di(lower alkyl)amino-3-ethoxy- 22-methyl-24-norchola-3,5,20(22)-triene thus obtained is converted to a 23-di(lower alkyl)amino-22-methyl-24-norchola-4,20(22)-dien-3-one hydrochloride by heating with dilute hydrochloric acid. From a 3β-(hydroxy/lower alkanoyloxy) - N,N - di(lower alkyl)-22-methyl-24-norchola-5,20(22)-dien-23-amide, on heating in tetrahydrofuran with lithium tetrahydroaluminate(1-), a 23-di(lower alkyl)amino - 22 - methyl-24-norchola-5,20(22)-dien-3β-ol eventuates. Contacting such 3β-ol in a mixture of chloroform and pyridine with an anhydride of the formula (lower alkanoyl)₂O affords a 21-di(lower alkyl)amino-3β-(lower alkanoyloxy)-22-methyl-24-norchola-5,20(22)-diene.

The basic amines of this invention are converted to the corresponding acid addition salts hereof by admixture with 1 equivalent of any of various inorganic and strong organic acids wherein the anion is defined by X above. The salts, in turn, are reconverted to the basic amines upon contacting with excess alkali.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

A. N,N,22-Trimethyl - 3β - propionyloxy-24-norchola-5,20(22)-dien-23-amide. To a solution of 100 parts of 3β-propionyloxypregn-5-en-20-one and 45 parts of N,N-dimethyl-1-propynylamine in 350 parts of dioxane is added, with stirring, 1 part of boron trifluoride etherate. Heat is evolved, and a reflux condenser is provided to insure that solvent is not lost. Stirring is continued for 15 minutes after the addition is complete, whereupon the solvent is stripped by vacuum distillation. The residue is N,N,22-trimethyl - 3β - propionyloxy - 24 - norchola - 5,20(22)-dien-23-amide, a mixture of the cis and trans isomers which can be represented by the formula

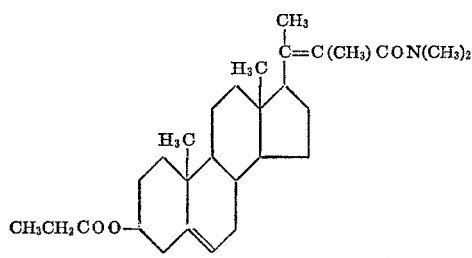

B. 3β-Hydroxy-N,N,22-trimethyl - 24 - norchola-5,20-(22)-dien-23-amide. To a solution of 2 parts of N,N,22-trimethyl-3β-propionyloxy - 24 - norchola-5,20(22)-dien-23-amide in 50 parts of methanol is added, with stirring, a solution of 2 parts of potassium carbonate in 10 parts of water. The resultant mixture is stirred overnight, then partitioned between water and dichloromethane. The dichloromethane phase is separated, dried over anhydrous sodium sulfate, and stripped of solvent by vacuum distillation. The residue is 3β-hydroxy-N,N-22-trimethyl-24-norchola-5,20(22)-dien-23-amide.

C. N,N,22-trimethyl - 3 - oxo-24-norchola-4,20(22)-dien-23-amide. To a solution of 17 parts of 3β-hydroxy-N,N,22-trimethyl - 24 - norchola-5,20(22)-dien-23-amide in a mixture of 175 parts of cyclohexanone and 800 parts of toluene at the boiling point under reflux is added, portionwise with stirring, a solution of 20 parts of aluminum isopropoxide in 150 parts of toluene. Heating at the boiling point under reflux with stirring is continued for 1¼ hours after the addition is complete, whereupon the reaction mixture is cooled and then mixed with a solution of 100 parts of Rochelle salt in 200 parts of water. The mixture thus obtained is steam distilled to remove solvent. The distillant is then cooled, whereupon insoluble solids are filtered off and taken up in a mixture of 25 parts of ethyl acetate with 25 parts of dichloromethane. The resultant solution is dried over anhydrous sodium sulfate and then stripped of solvents by vacuum distillation. The residue is N,N-trimethyl-3-oxo-24-norchola-4,20(22)-dien-23-amide.

D. 23 - Dimethylamino - 22 - methyl-24-norchola-4,20-(22)-dien-3-one. To a solution of 20 parts of N,N,22-trimethyl-3-oxo-24-norchola - 4,20(22) - dien-23-amide and 25 parts of triethyl orthoformate in a mixture of 60 parts of dioxane and 40 parts of absolute ethanol at 0° is added, with stirring, 2 parts of p-toluenesulfonic acid monohydrate. The resultant solution is stirred for 15 minutes, then poured into a solution of 280 parts of pyridine in 14,000 parts of water. The supernatant aqueous phase is decanted from the oil which forms, and the oil is dissolved in 2000 parts of chloroform. The chloroform solution is dried over anhydrous sodium sulfate and stripped of solvent by vacuum distillation. The residue is dissolved in 3000 parts of tetrahydrofuran. To this solution is added 40 parts of lithium tetrahydroaluminate(1-). The resultant mixture is heated at the boiling point under reflux overnight, at which point 400 parts of ethyl acetate is introduced. The mixture thus obtained is poured into a solution of 500 parts of concentrated hydrochloric acid in 15,000 parts of water, and the resultant mixture is stirred for ½ hour and then partitioned between chloroform and excess aqueous 5% potassium carbonate. The chloroform phase is separated, dried over anhydrous sodium sulfate, and finally stripped of solvent by vacuum distillation. The residue is 23-dimethylamino-22-methyl-24-norchola-4,20(22)-dien-3-one, having the formula

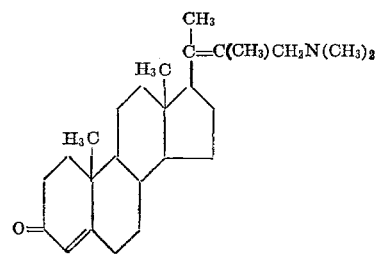

Example 2

A. 3β-Acetoxy - N,N - diethyl-22-methyl-24-norchola-5,20(22)-dien-23-amide. Substitution of 100 parts of 3β-acetoxypregn-5-en-20-one for the 3β-propionyloxypregn-5-en-20-one called for in Example 1A affords, by the procedure there described, a mixture of cis and trans 3β-acetoxy-N,N-diethyl - 22 - methyl-24-norchola-5,20(22)-dien-23-amide, which can be separated as follows: The mixture is taken up in benzene; and the benzene solution is chromatographed on silica gel, using benzene and mixtures thereof with increasing amounts of ethyl acetate as developing solvents. From an eluate comprising 33% ethyl acetate in benzene, on evaporation of solvent and recrystallization of the residue from a mixture of ethyl acetate and petroleum ether, (E)-3β-acetoxy-N,N-diethyl-22-methyl-24-norchola-5,20(22)-dien-23-amide melting at 181–183° is obtained. From the mother liquor, upon evaporation of the solvent and crystallization of the residue from aqueous methanol, (Z)-3β-acetoxy-N,N-diethyl-22-methyl-24-norchola-5,20(22)-dien-23-amide melting at about 112–115° C. is obtained. Both products are colorless.

B. (E)-N,N-Diethyl-3β-hydroxy - 22 - methyl-24-norchola-5,20(22)-dien-23-amide. Substitution of 2 parts of (E)-3β-acetoxy-N,N-diethyl - 22 - methyl-24-norchola-5,20(22)-dien-23-amide for the N,N,22-trimethyl-3β-propionyloxy-24-norchola-5,20(22)-dien-23-amide called for in Example 1B affords, by the procedure there detailed, (E)-N,N-diethyl-3β-hydroxy-22-methyl - 24 - norchola-5,20(22)-dien-23-amide which, crystallized from a mixture of ethyl acetate and petroleum ether, is obtained as a colorless substance melting at 238–240°.

C. (E)-N,N-Diethyl - 22 - methyl-3-oxo-23-norchola-4,20(22)-dien-23-amide. Substitution of 17 parts of (E)-N,N-diethyl - 3β - hydroxy-22-methyl-24-norchola-5,20(22)-dien-23-amide for the 3β-hydroxy-N,N,22-trimethyl-24-norchola-5,20(22)-dien-23-amide called for in Example 1C affords, by the procedure there detailed, (E)-N,N-diethyl - 22 - methyl-3-oxo-23-norchola-4,20(22)-dien-23-amide which, crystallized from a mixture of ether and petroleum ether, is obtained as a colorless material melting at 125–130°.

D. (E)-23-Diethylamino - 22 - methyl-24-norchola-4,20(22)-dien-3-one hydrochloride hemihydrate. To a solution of 10 parts of (E)-N,N-diethyl-22-methyl-3-oxo-24-norchola-4,20(22)-dien-23-amide and 15 parts of triethyl orthoformate in a mixture of 30 parts of dioxane and 20 parts of absolute ethanol at 0° is added, with stirring, 1 part of p-toluenesulfonic acid monohydrate. The resultant solution is stirred for 10 minutes, then poured into a solution of 10 parts of pyridine in 1000 parts of water. The precipitate which forms is filtered off, dried in air, and taken up in 500 parts of tetrahydrofuran. To this solution is added 10 parts of lithium tetrahydroaluminate(1-). The resultant mixture is heated at the boiling point under reflux overnight, then poured into a solution of 200 parts of concentrated hydrochloric acid in 2000 parts of water. The resultant mixture is stirred for ½ hour and then extracted with chloroform. The chloroform extract is dried over anhydrous sodium sulfate and stripped of solvent by vacuum distillation. The residual oil is crystallized from ethyl acetate to give colorless (E)-23-diethylamino-22-methyl-24-norchola - 4,20(22)-dien-3-one hydrochloride hemihydrate melting at approximately 241–242°.

Example 3

A. (Z)-N,N-Diethyl - 3β - hydroxy-22-methyl-24-norchola-5,20(22)-dien-23-amide. Substitution of 2 parts of (Z)-3β-acetoxy-N,N-diethyl - 22 - methyl-24-norchola-5,20(22)-dien-23-amide for the N,N,22-trimethyl-3β-propionyloxy-24-norchola-5,20(22)-dien-23-amide called for in Example 1B affords, by the procedure there detailed, (Z)-N,N-diethyl-3β-hydroxy - 2 - methyl - 24 - norchola-5,20(22)-dien-23-amide which, crystallized from a mixture of ethyl acetate and petroleum ether, is obtained as a colorless material melting at 243–247°.

B. (Z)-N,N-Diethyl - 22 - methyl-3-oxo-24-norchola-4,20(22)-dien-23-amide. To a solution of 13 parts of (Z)-N,N-diethyl - 3β - hydroxy - 22 - methyl-24-norchola-5,20(22)-dien-23-amide in 800 parts of toluene and 150 parts of cyclohexanone at the boiling point under reflux is added a solution of 15 parts of aluminum isopropoxide in 100 parts of toluene. Boiling under reflux is continued for 1½ hours after the addition is complete, whereupon the solution which eventuates is mixed with a solution of 100 parts of Rochelle salt in 200 parts of water. The resultant mixture is steam distilled to remove solvent. From the distillant, on cooling, (Z)-N,N,-diethyl-22-methyl-3-oxo-24-norchola-4,20(22)-dien-23-amide separates as a colorless crystalline solid melting at 134–136°. The product can be recrystallized from a mixture of ethyl acetate and petroleum ether.

C. (Z) - 23 - Diethylamino-22-methyl-24-norchola-4,20(22)-dien-3-one hydrochloride hemihydrate. To a solution of 20 parts of (Z)-N,N-diethyl-22-methyl-3-oxo-24-norchola-4,20(22)-dien-23-amide and 25 parts of triethyl orthoformate in 60 parts of dioxane and 40 parts of absolute ethanol at 0° is added, with stirring, 2 parts of p-toluenesulfonic acid monohydrate. The resultant solution is stirred for 15 minutes, then poured into a solution of 280 parts of pyridine in 14,000 parts of water. The aqueous supernatant is decanted from the oil which forms, and the oil is taken up in chloroform. The chloroform solution is dried over anhydrous sodium sulfate and stripped of solvent by vacuum distillation. The residue is dissolved in 3000 parts of tetrahydrofuran. To this solution is added 40 parts of lithium tetrahydroaluminate(1-). The resultant mixture is heated at the boiling point under reflux overnight, at which point 400 parts of ethyl acetate is introduced. The mixture thus obtained is poured into a solution of 500 parts of concentrated hydrochloric acid in 15,000 parts of water, and the resultant mixture is stirred for ½ hour and then extracted with chloroform. The chloroform extract is dried over anhydrous sodium sulfate and stripped of solvent by vacuum distillation. The residual oil is crystallized from ethyl acetate to give (Z)-23-diethylamino-22-methyl - 24 - norchola-4,20(22)-dien-3-one hydrochloride hemihydrate as colorless crystals melting at 231–233°.

Example 4

23-Dimethylamino - 22 - methyl-24-norchola-5,20(22)-dien-3β-ol. To a solution of 5 parts of N,N,22-trimethyl-3β-propionyloxy-24-norchola-5,20(22)-dien - 23 - amide in 150 parts of tetrahydrofuran is added 3 parts of lithium tetrahydroaluminate(1-). The resultant mixture is heated at the boiling point under reflux overnight, whereupon 10 parts of ethyl acetate is introduced. The mixture thus obtained is partitioned between 1000 parts of 5% hydrochloric acid and 2000 parts of chloroform. The chloroform phase is separated, washed with excess aqueous 5% potassium carbonate, dried over anhydrous sodium sulfate, and stripped of solvent by vacuum distillation. The residue is 23-dimethylamino-22-methyl-24-norchola-5,20(22)-dien-3β-ol.

Example 5

A. (E)-23-Diethylamino - 22 - methyl-24-norchola-5,20(22)-dien-3β-ol hydrochloride. To a solution of 5 parts of lithium tetrahydroaluminate(1-) in 350 parts of tetrahydrofuran is added 10 parts of (E)-3β-acetoxy-N,N-diethyl - 22 - methyl-24-norchola-5,20(22)-dien-23-amide. The resultant mixture is heated at the boiling point under reflux overnight, whereupon 50 parts of ethyl acetate is introduced. The solution thus obtained is poured into a solution of 100 parts of concentrated hydrochloric acid in 1000 parts of water, affording a clear solution which is extracted with dichloromethane. The dichloromethane extract is stripped of solvent by vacuum distillation, and the residual solid is digested with 250 parts of boiling ethyl acetate. The insoluble colorless solid, isolated by filtration, is (E)-23-diethylamino-22-methyl-24-norchola-5,20(22)-dien-3β-ol hydrochloride melting at 259–261°.

B. (E) - 23 - Diethylamino-22-methyl-24-norchola-5,20(22)-dien-3β-ol. Approximately 1 part of (E)-23-diethylamino-22-methyl-24-norchola-5,20(22)-dien-3β-ol hydrochloride is mixed with 100 parts of aqueous 1% potassium carbonate and 100 parts of dichloromethane. The dichloromethane phase is then separated, dried over anhydrous sodium sulfate, and stripped of solvent by vacuum distillation. The residue, crystallized from aqueous methanol, is (E) - 23-diethylamino-22-methyl-24-norchola-5,20(22)-dien-3β-ol melting at 110–112°.

Example 6

(Z)-23-Diethylamino-22-methyl-24-norchola-5,20(22)-dien-3β-ol hydrochloride. To a solution of 5 parts of lithium tetrahydroaluminate(1-) in 500 parts of tetrahydrofuran is added 10 parts of (Z)-N,N-diethyl-3β-hydroxy-22 - methyl-24-norchola-5,20(22)-dien-23-amide; and the resultant mixture is heated at the boiling point under reflux overnight, whereupon 50 parts of ethyl acetate is added. The gel which eventuates is poured into 2000 parts of approximately 4% hydrochloric acid. The clear solution thus obtained is extracted with dichloromethane. The dichloromethane extract is dried over anhydrous sodium sulfate and stripped of solvent by vacuum distillation. The colorless residue is digested with 1000 parts of boiling ethyl acetate for ½ hour. Upon cooling, insoluble solids are filtered out. The product thus isolated is (Z)-23-diethylamino - 22 - methyl-24-norchola-5,20(22)-dien-3β-ol hydrochloride melting at 254–257°.

Example 7

3β - Acetoxy-23-dimethylamino-22-methyl-24-norchola-5,20(22)-diene. A mixture of 1 part of 23-dimethylamino-22-methyl-24-norchola-5,20(22)-dien-3β-ol with 4 parts of acetic anhydride and 5 parts of pyridine is allowed to stand at room temperatures overnight, whereupon 100 parts of methanol is added and the resultant mixture is stripped of solvent by vacuum distillation. The residue is extracted with 100 parts of chloroform, the chloroform extract is washed with 100 parts of aqueous 5% potassium carbonate, the carbonate wash is extracted with 50 parts of chloroform, and the chloroform extracts are combined, dried over anhydrous sodium sulfate, and stripped of solvent by vacuum distillation. The residue thus obtained is 3β-acetoxy-23-dimethylamino-22-methyl-24-norchola-5,20(22)-diene.

Example 8

(E)-3β-Acetoxy-23-diehtylamino-22-methyl-24-norchola-5,20(22)-diene. Substiution of 1 part of (E)-23-diethylamino-22-methyl-24-norchola-5,20(22)-dien-3β-ol for the 23 - dimethylamino-22-methyl-24-norchola-5,20(22)-dien-3β-ol called for in Example 7 affords, by the procedure there detailed, (E)-3β-acetoxy-23-diethylamino-22-methyl - 24-norchola-5,20(22)-diene which, crystallized from methanol, is obtained as a colorless solid melting at 119–122°.

Example 9

A. (Z) - 3β-Acetoxy-23-diethylamino-22-methyl-24-norchola-5,20(22)-diene. To a mixture of 15 parts of acetic anhydride and 25 parts of pyridine is added 3 parts of (Z) - 23 - diethylamino-22-methyl-24-norchola-5,20(22)-dien-3β-ol hydrochloride, followed by 15 parts of chloroform. The resultant mixture is stirred at room temperatures for 48 hours, then mixed with 100 parts of aqueous 5% potassium carbonate. The organic phase is separated, the aqueous phase is extracted with chloroform, the chloroform extract is combined with the organic phase, and the resultant solution is dried over anhydrous sodium sulfate and then stripped of solvent by vacuum distillation. The residue, crystallized from methanol, is (Z)-3β-acetoxy - 23 - diethylamino - 22-methyl-24-norchola-5,20 (22)-diene melting at 103–105°. The product is colorless.

B. (Z) - 3β-Acetoxy-23-diethylamino-22-methyl-24-norchola-5,20(22)-diene hydrochloride. Approximately 2 parts of (Z) - 3β - acetoxy-23-diethylamino-22-methyl-24-norchola-5,20(22)-diene is dissolved in 100 parts of approximately 4% hydrochloric acid. The resultant solution is extracted with chloroform. The chloroform extract is dried over anhydrous sodium sulfate and then stripped of solvent by vacuum distillation. The residue, which crystallizes from ethyl acetate as a colorless solid melting at 243–245°, is (Z) - 3β - acetoxy-23-diethylamino-22-methyl-24-norchola-5,20(22)-diene hydrochloride.

Example 10

(Z) - 23 - Diethylamino-22-methyl-3β-propionyloxy-24-norchola-5,20(22)-diene. Substitution of 4 parts of propionic acid anhydride for the acetic anhydride called for in Example 8 affords, by the procedure there detailed, (Z) - 23-diethylamino-22-methyl-3β-propionyloxy-24-norchola-5,20(22)-diene.

What is claimed is:
1. A compound of the formula

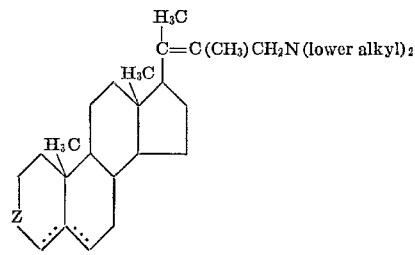

wherein Z represents β-(lower alkanoyloxy)methylene, β-hydroxymethylene, or carbonyl and the dotted line denotes Δ⁴ unsaturation when Z represents carbonyl and Δ⁵ unsaturation otherwise.

2. A compound according to Claim 1 which is 23-di (lower alkyl)amino - 22 - methyl-24-norchola-4,20(22)-dien-3-one.

3. A compound according to Claim 1 which is 23-diethylamino-22-methyl-24-norchola-4,20(22)-dien-3-one.

4. A compound according to Claim 1 which is 23-di (lower alkyl)amino - 22 - methyl-24-norchola-5,20(22)-dien-3β-ol.

5. A compound according to Claim 1 which is 23-diethylamino-22-methyl-24-norchola-5,20(22)-dien-3β-ol.

6. A compound according to Claim 1 which is 23-di (lower alkyl)amino - 3β-(lower alkanoyloxy)-22-methyl-24-norchola-5,20(22)-diene.

7. A compound according to Claim 1 which is 3β-acetoxy - 23 - diethylamino-22-methyl-24-norchola-5,20(22)-diene.

8. A compound of the formula

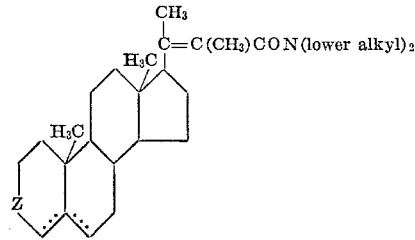

wherein Z represents β-(lower alkanoyloxy)methylene, β-hydroxymethylene or carbonyl and the dotted line denotes Δ⁴ unsaturation when Z represents carbonyl and Δ⁵ unsaturation otherwise.

9. A compound according to Claim 8 which is 3β-(loweralkanoyloxy) - N,N-di(lower alkyl)-22-methyl-24-norchola-5,20(22)-dien-23-amide.

10. A compound according to Claim 8 which is 3β-acetoxy - N,N - diethyl - 22-methyl-24-norchola-5,20(22)-dien-23-amide.

11. A compound according to Claim 8 which is 3β-hydroxy - N,N-di(lower alkyl)-22-methyl-24-norchola-5,20 (22)-dien-23-amide.

12. A compound according to Claim 8 which is 3β-hydroxy - N,N - diethyl - 22-methyl-24-norchola-5,20(22)-dien-23-amide.

13. A compound according to Claim 8 which is N,N-di(lower alkyl) - 22-methyl-3-oxo-24-norchola-4,20(22)-dien-23-amide.

14. A compound according to Claim 8 which is N,N-diethyl - 22 - methyl-3-oxo-24-norchola-4,20(22)-dien-23-amide.

No references cited.

HENRY A. FRENCH, Primary Examiner

U.S. Cl. X.R.

260—397.3, 397.5

UNITED STATES PATENT OFFICE
CERTIFICATE OF CORRECTION

Patent No. 3847954                     Dated Nov. 12, 1974

Inventor(s) George R. Lenz

It is certified that error appears in the above-identified patent and that said Letters Patent are hereby corrected as shown below:

Column 2, line 61, "N,N-(lower" should be -- N,N-di(lower --.

Column 4, line 13, "n,n-trimethyl" should be -- n,n,22-trimethyl --.

Column 5, line 53, "hydroxy-2-methyl" should be -- hydroxy-22-methyl --.

Column 7, line 30, "diehtylamina" should be -- diethylamino -- and "norchlo-" should be -- norcho- --.

Column 8, first formula, "H$_3$C" should be -- CH$_3$ --.
              |                        |
              C=                       C=

Column 8, line 51, Claim 9, "eralkanoyloxy" should be -- er alkanoyloxy --.

Signed and sealed this 22nd day of April 1975.

(SEAL)
Attest:

RUTH C. MASON
Attesting Officer

C. MARSHALL DANN
Commissioner of Patents
and Trademarks

FORM PO-1050 (10-69)